(12) United States Patent
Ohk (10) Patent No.: US 8,941,900 B2
(45) Date of Patent: Jan. 27, 2015

(54) IMAGE FORMING APPARATUS AND METHOD OF PROCESSING IMAGE THEREOF

(75) Inventor: Hyung-soo Ohk, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 114 days.

(21) Appl. No.: 13/218,588

(22) Filed: Aug. 26, 2011

(65) Prior Publication Data

US 2012/0050828 A1 Mar. 1, 2012

(30) Foreign Application Priority Data

Aug. 26, 2010 (KR) .................. 10-2010-0082958

(51) Int. Cl.
*G03F 3/08* (2006.01)
*H04N 1/60* (2006.01)
*H04N 1/46* (2006.01)

(52) U.S. Cl.
CPC .................................. *H04N 1/6072* (2013.01)
USPC ............. 358/518; 358/1.9; 358/521; 358/501

(58) Field of Classification Search
CPC ............. G03F 3/00; G03F 3/10; G03F 3/101; H04N 1/40; H04N 1/40012
USPC ........................................................ 358/518
See application file for complete search history.

(56) References Cited

U.S. PATENT DOCUMENTS

| 5,973,802 A * | 10/1999 | Hirota et al. .................. 358/521 |
| 2009/0109454 A1* | 4/2009 | Nagarajan et al. ............. 358/1.9 |
| 2009/0180164 A1 | 7/2009 | Miyagi |
| 2009/0213396 A1* | 8/2009 | Togami ......................... 358/1.9 |

FOREIGN PATENT DOCUMENTS

| EP | 2096860 | 9/2009 |
| JP | 08-244281 | 9/1996 |
| KR | 1020050111259 | 11/2005 |

OTHER PUBLICATIONS

Extended European Search Report dated Nov. 28, 2011 issued in EP Application No. 11178727.1.

* cited by examiner

*Primary Examiner* — Fred Guillermety
*Assistant Examiner* — Henok A Shiferaw
(74) *Attorney, Agent, or Firm* — Staas & Halsey LLP (57) ABSTRACT

An image forming apparatus and a method of processing an image of the image forming apparatus are provided. The image forming apparatus includes a scanner to scan a document, a detector to detect text and image areas included in the scanned document, a conversion unit to convert the scanned document so as to output one of the detected text and image areas as color data and the other as monochrome data, and an output unit to output the converted document, wherein the conversion unit converts the scanned document to set a color value of the detected text area to a preset color value so as to output the detected text area as monochrome data or set a color value of the detected image area to a preset color value so as to output the detected image area as monochrome data.

21 Claims, 10 Drawing Sheets (4 of 10 Drawing Sheet(s) Filed in Color)

IMAGE FORMING APPARATUS AND METHOD OF PROCESSING IMAGE THEREOF

CROSS-REFERENCE TO RELATED APPLICATIONS

This application claims the benefit of priority under 35 U.S.C. §119 to Korean Patent Application No. 10-2010-0082958, filed on Aug. 26, 2010, in the Korean Intellectual Property Office, the disclosure of which is incorporated herein by reference in its entirety.

BACKGROUND

1. Field of the Invention

The present general inventive concept generally relates to an image forming apparatus and a method of processing an image thereof, and more particularly, to an image forming apparatus which can designate a color of a document which will be output and a method of processing an image thereof.

2. Description of the Related Art

An image forming apparatus generates, prints, receives, and transmits image data. Examples of an image forming apparatus include a printer, a scanner, a copier, a fax, a multifunction peripheral having combined functions of them, etc.

A general image forming apparatus has a monochrome mode, a color mode, and an auto-mode. The monochrome mode is to output a document as monochrome data, and the color mode is to output color information of a document as it is. Also, the auto-mode is to selectively output a document as one of monochrome data and color data according to a ratio of color pixels occupied in the document.

In order to save maintenance cost of a color toner in a document in which letters and images are mixed, most users output the document using a monochrome mode. This is to output an image, which occupies most of a color toner in a document, as monochrome data so as to reduce a consumed amount of the color toner.

However, if a text which has a relatively small consumption ratio of a color toner in comparison with an image is changed into monochrome data, information recorded on the original text may be missed, like important words that are processed in color.

Also, a method of designating an output color of a desired area of a document like an image area and a letter area according to the preference of a user is required.

SUMMARY

The present general inventive concept provides an image forming apparatus which can output one of a text area and an image area of a document as color data and the other as monochrome data and a method of processing an image thereof.

Aspects and utilities of the present general inventive concept will be set forth in part in the description which follows and, in part, will be obvious from the description, or may be learned by practice of the general inventive concept.

The foregoing and/or other features utilities of the present general inventive concept may be realized by a method of processing an image of an image forming apparatus, the method including scanning a document, detecting a text area and an image area included in the scanned document, converting the scanned document to output one of the detected text and image areas as color data and the other of the detected text and image areas as monochrome data, and outputting the converted document, wherein the scanned document is converted to set a color value of the detected text area to a preset color value so as to output the detected text area as monochrome data or to set a color value of the detected image area to a preset color value so as to output the detected image area as monochrome data.

If the scanned document is converted to output the detected text area as monochrome data, and the detected text area includes a color text, the color text may be converted to have a different display state from a monochrome text of the text area.

The method may further include receiving a user command to select one of first and second modes, wherein the first mode is to output the text area as color data and the image area as monochrome data, and the second mode is to output the text area as monochrome data and the image area as color data.

If the user command to select one of the first and second modes is input, the scanned document may be converted to output one of the detected text and image areas as color data and the other of the detected text and image areas as monochrome data based on the received user command.

The foregoing and/or other features and utilities of the present general inventive concept may also be realized by an image forming apparatus including a scanner to scan a document, a detector to detect text and image areas included in the scanned document, a conversion unit to convert the scanned document so as to output one of the detected text and image areas as color data and the other of the detected text and image areas as monochrome data, and an output unit to output the converted document, wherein the conversion unit converts the scanned document to set a color value of the detected text area to a preset color value so as to output the detected text area as monochrome data or to set a color value of the detected image area to a preset color value so as to output the detected image area as monochrome data.

If the detected text area is output as monochrome data and includes a color text, the conversion unit may convert the color text to have a different display state from a monochrome text of the detected text area.

The image forming apparatus may further include a user interface unit to receive a user command to select one of first and second modes, wherein the first mode is to output the text area as color data and the image area as monochrome data, and the second mode is to output the text area as monochrome data and the image area as color data.

If the user command to select one of the first and second modes is received, the conversion unit may convert the scanned document to output one of the detected text and image areas as color data and the other of the detected text and image areas as monochrome data based on the received user command.

The foregoing and/or other features and utilities of the present general inventive concept may also be realized by an image forming apparatus including an input unit to receive an image including text and image areas, a user interface unit to display and to receive a user command to select at least one of first through fifth modes as an output mode, wherein the first mode is to output the text area as color data and the image area as monochrome data, the second mode is to output the text area as monochrome data and the image area as color data, the third mode is to output the received image as monochrome data, the fourth mode is to output the received image as color data, and the fifth mode is to automatically output the received image as one of color data and monochrome data according to a color ratio of the received image, a conversion unit to convert a color of the received image according to the selected output mode, and an output unit to output the image of which color has been converted.

If one of the first and second modes is selected, the conversion unit may convert the color of the received image such that one of the text and image areas of the received image is color data and the other of the text and image areas is monochrome data.

The input unit may receive an image from an external host device.

If the third mode is selected, the conversion unit may convert a color text of the text area of the received image to have an underline or be in bold.

If the received image is a color image, and the first mode is selected, the conversion unit may convert the image area of the received image into monochrome data.

If the received image is a color image, and the second mode is selected, the conversion unit may convert text area of the received image into monochrome data.

The foregoing and/or other features and utilities of the present general inventive concept may also be realized by an image forming apparatus including a scanner to scan a document, a detector to detect at least one text area and at least one image area included in the scanned document, a user interface unit to separately display the detected text and image areas and display a selection area to select each of the displayed text and image areas as one of color data and monochrome data, a conversion unit to convert each of the text and image areas as one of color data and monochrome data according to the selection in the selection area, and an output unit to output the converted document.

The foregoing and/or other features and utilities of the present general inventive concept may also be realized by an image forming apparatus including a scanner to scan a document, a detector to detect text and image areas included in the scanned document, a user interface unit to receive a user command to select an output mode of the scanned document, a conversion unit to process at least one of the detected text and image areas based on the received user command, and an output unit to output the processed document, wherein if an output mode to output the scanned document as monochrome data is selected, the conversion unit converts a color value of the scanned document into a preset color value, if an output mode to output the scanned document as color data is selected, the conversion unit maintains the color value of the scanned document and transmits the color value to the output unit, if an output mode to output the text area as color data and the image area as monochrome data is selected, the conversion unit maintains a color value of the detected text area and converts a color value of the detected image area into a preset color value, or if an output mode to output the text area as monochrome data and the image area as color data is selected, the conversion unit converts the color value of the detected text area into the preset color value and maintains the color value of the detected image area.

The foregoing and/or other features and utilities of the present general inventive concept may also be achieved by an image forming apparatus including a detector to receive an electronic document and to detect at least one text area and at least one image area of the electronic document, a conversion unit to convert the electronic document by converting at least one of the detected text or image areas from color data to monochrome data and maintaining another of the detected text or image areas as color data, and an output unit to output the converted electronic document.

The image forming apparatus may include a user interface unit to receive a user command to select at least one output mode of the electronic document, wherein the conversion unit converts the electronic document according to the selected output mode.

One output mode may be selected and correspond to the entire electronic document or a plurality of output modes may be selected to correspond to each respective detected text area and each respective detected image area.

The conversion unit may convert the at least one detected text area or image area to monochrome data by setting a color value of the at least one detected text area or image area to a preset color value. When each respective detected text area is converted to monochrome data, the conversion unit may change a display state of any color text included in the respective detected text area to have an underline or be in bold.

The output unit may output the converted electronic document by printing the converted electronic document on a paper medium or displaying the converted electronic document on a display screen.

BRIEF DESCRIPTION OF THE DRAWINGS

The patent or application file contains at least one drawing executed in color. Copies of this patent or patent application publication with color drawings will be provided by the Office upon request and payment of the necessary fee.

Exemplary embodiments of the present general inventive concept will be more clearly understood from the following detailed description taken in conjunction with the accompanying drawings in which.

DETAILED DESCRIPTION OF THE EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Figure 1:
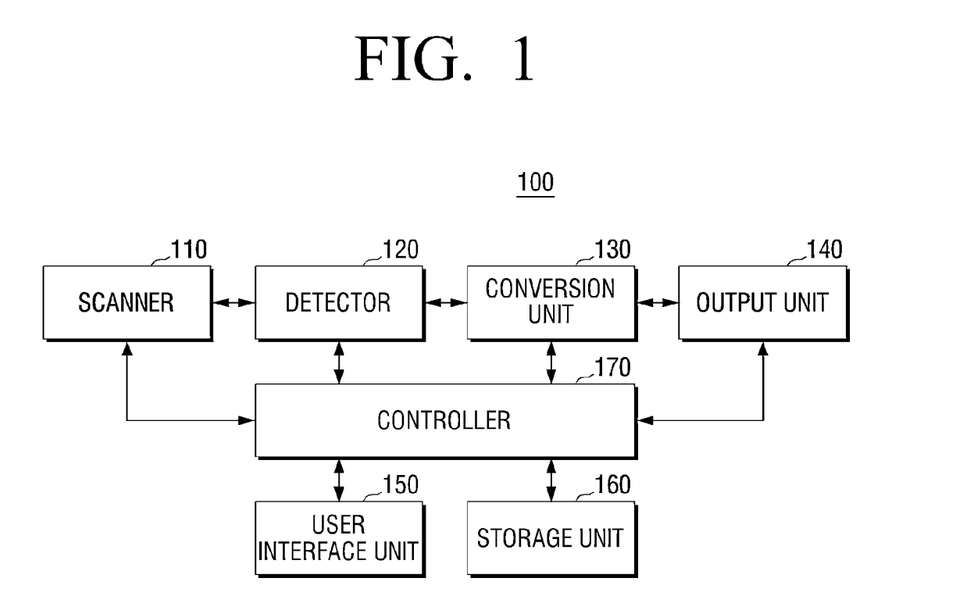
FIG. 1 is a block diagram illustrating an image forming apparatus according to an exemplary embodiment of the present general inventive concept.

FIG. 1 is a block diagram illustrating an image forming apparatus 100 according to an exemplary embodiment of the present general inventive concept.

Referring to FIG. 1, the image forming apparatus 100 includes a scanner 110, a detector 120, a conversion unit 130, an output unit 140, a user interface unit 150, a storage unit 160, and a controller 170.

The scanner 110 scans a document. In general, the scanner 110 scans the document to generate an RGB image of the document having R, G, and B values.

The document may be a mixed document in which an image area and a text area are mixed. The image area may include a graphic or a photograph. The document scanned by the scanner 110 may be an image having a plurality of pixels and may include at least one text area and at least one image area.

The scanner 110 digitizes the scanned document using a charge-coupled device (CCD)/complementary metal-oxide semiconductor (CMOS) image sensor (CIS) module or the like.

The scanner 110 also performs a scan gamma correction to correct brightness of the scanned document.

The scanner 110 performs a scan color correction to convert the scanned document having an RGB color space into another color space such as an YCbCr color space or the like. If the scan color correction is performed, well-known various color spaces such as a Lab color space may be used. The scanned document may have a different color characteristic according to a CCD/CIS, and the scan color correction may perform a process of removing such a color characteristic.

The detector 120 detects the text and image areas which are included in the scanned document. A method of detecting a text area and an image area included in a scanned document to distinguish a text area, an image area, and a background area may be referred to as a segmentation method. A text, an image, and a background may be objects.

The detector 120 analyzes an image (i.e., the scanned document) which is input through the scanner 110 in order to determine which one of a text, an image, and a background each of pixels belongs to. All of the pixels of the input image are allocated one of text, image, and background characteristics.

The detector 120 detects the text and image areas included in the scanned document using an YCbCr color space. In this case, the detector 120 may also use edge information which indicates a difference between brightness values of a respective pixel and its neighboring pixel which can be calculated using a Y channel. In other words, the detector 120 may use brightness value information (Y channel), color information (CbCr channel), and edge information of a respective pixel of the scanned document and may also consider information of neighboring pixels.

The operation of the detector 120 will be described in more detail later with reference to FIG. 2.

The conversion unit 130 converts at least one of the text and image areas to output one of the detected text and image areas as color data and the other as monochrome data.

In more detail, the conversion unit 130 may set a color value of the detected text area to a preset color value to output the detected text area as monochrome data. Alternatively, the conversion unit 130 may set a color value of the detected image area to a preset color value to output the detected image area as monochrome data.

Here, the preset color value may be a color value which is set to have a specific color, i.e., a monochrome color, or a color value which is set to have a black-and-white color, i.e., an achromatic color. For example, the conversion unit 130 may set a color value (i.e., a CbCr value) to "0" to output a black-and-white color.

The monochrome data may be data having a monochrome color or data having an achromatic color.

If the detected text area is to be converted to be output as monochrome data and includes a color text, the conversion unit 130 may convert the color text so that the color text has a different display state from a monochrome text of the text area.

The different display state may include a state in which a color text of an original text area is displayed with an underline or in bold.

The conversion unit 130 may also convert one of the detected text and image areas into color data and the other into monochrome data based on an input mode. In more detail, the conversion unit 130 converts a color of a whole part or a part of the scanned document into one of color data and monochrome data using characteristic information of each of the pixels according to the area that the detector 120 detects the pixel as belonging to and a mode which is input through the user interface unit 150.

The output unit 140 outputs the converted document.

The output unit 140 performs a print gamma correction to correct brightness of the converted document (i.e., a document which will be output), a print color correction to convert an YCbCr color space into a cyan-magenta-yellow-black (CMYK) color space for printing, and halftoning to convert an 8-bit 3-channel contone image into a 1-bit 4-channel CMYK image.

The output of the converted document performed by the output unit 140 may refer to an operation (i.e., a printing operation or a copying operation) of printing the converted document on a printing medium. The output of the converted document performed by the output unit 140 may also refer to an operation (i.e., a scanning operation) of displaying the converted document on a display screen.

The user interface unit 150 receives a user command.

In more detail, the user interface unit 150 displays at least one of a first through fifth modes as an output mode. The first mode is to output a text area as color data and an image area as monochrome data, the second mode is to output the text area as monochrome data and the image area as color data, and the third mode is to output a received image as monochrome data. The fourth mode is to output the received image as color data, and the fifth mode is to automatically output the received image as one of color data and monochrome data according to a color ratio of the received image.

The user interface unit 150 receives a user command to output each of at least one displayed text area and at least one displayed image area as color data or monochrome data.

The user interface unit 150 performs the above-described operations using a control panel installed in an area of the image forming apparatus 100 or a touch screen.

The storage unit 160 stores printing data which is transmitted from an external host device (not shown).

The storage unit 160 segments the scanned document or a document which is transmitted from the external host device into an image area and a text area, and separately stores the image and text areas. The printing data which will be transmitted from the external host device and stored in the storage unit 160 may be segmented into an image area, a text area, and a background area. The storage unit 160 may receive and store information to distinguish the image, text, and background areas along with the printing data.

The storage unit 160 also stores various algorithms to detect the text and image areas included in the scanned document. The various algorithms are stored in program or application formats in the storage unit 160. The storage unit 160 stores the characteristic information of each of the pixels of the scanned document which is detected by the detector 120.

The controller 170 performs overall control operations with respect to various elements (110 through 160) of the image forming apparatus 100.

For example, the controller 170 may control the scanner 110 to scan the document or the detector 120 to detect the text and image areas included in the scanned document. The controller 170 may control the conversion unit 130 to convert the scanned document so as to output one of the detected text and image areas as color data and the other as monochrome data. The controller 170 may control the output unit 140 to output the converted document.

According to an exemplary embodiment, the image forming apparatus 100 may include the scanner 110 which scans a document, the detector 120 which detects text and image areas included in the scanned document, the conversion unit 130 which converts the document to output one of the detected text and image areas as color data and the other as monochrome data, and the output unit 140 which outputs the converted document. Here, the conversion unit 130 may set a color value of the detected text area to a preset color value to output the detected text area as monochrome data or may set a color value of the detected image area to a preset color value to output the detected image area as monochrome data.

According to another exemplary embodiment, the image forming apparatus 100 may include the scanner 110 which scans a document, the detector 120 which detects at least one text area and at least one image area included in the scanned document, the user interface unit 150 which separately displays the text and image areas and displays a selection area for selecting each of the displayed text and image areas as one of color data and monochrome data, the conversion unit 130 which converts each of the text and image areas into one of color data and monochrome data as selected in the selection area, and the output unit 140 which outputs the converted document.

According to another exemplary embodiment, the image forming apparatus 100 may include the scanner 110 which scans a document, the detector 120 which detects text and image areas included in the scanned document, the user interface unit 150 which receives a user command to select an output mode of the scanned document, the conversion unit 130 which processes at least one of the detected text and image areas based on the user command, and the output unit 140 which outputs the processed document. If an output mode to output the scanned document as monochrome data is input, the conversion unit 130 may convert a color value of the scanned document into a preset color value. If an output mode to output the scanned document as color data is input, the conversion unit 130 may maintain the color value of the scanned document and transmit the color value to the output unit 140. If an output mode to output the text area as color data and the image area as monochrome data is input, the conversion unit 130 may maintain a color value of the text area and convert a color value of the image area into a preset color value. If an output mode to output the text area as monochrome data and the image area as color data is input, the conversion unit 130 may convert the color value of the text area into the preset color value and maintain the color value of the image area.

According to the present general inventive concept, a text area and an image area may be set to be respectively output in different colors so as to minimize loss of information and reduce a consumed amount of a color toner.

The image forming apparatus 100 according to the exemplary embodiments of the present general inventive concept may be one of a scanner, a copier, a printer, and a multifunction peripheral having combined functions of them.

Figure 2:
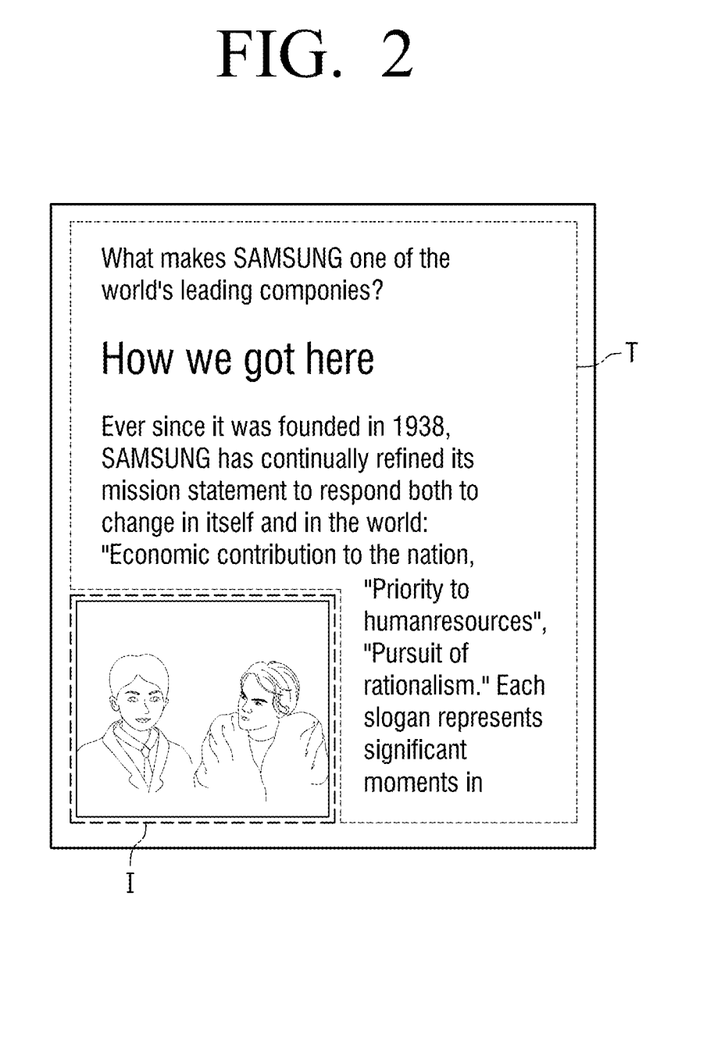
FIG. 2 is a view illustrating an operation of a detector according to an exemplary embodiment of the present general inventive concept.

FIG. 2 is a view illustrating an operation of the detector 120 according to an exemplary embodiment.

Referring to FIG. 2, a scanned document is a mixed document including an image area I and a text area T. The scanned document includes three text areas but may include a single text area. The scanned document includes one image area I, but may include a plurality of image areas.

The detector 120 distinguishes the image area I and the text area T from the scanned document. For this purpose, the detector 120 may use various methods such as a method of using changes in brightness values of pixels of the scanned document, a method of segmenting the scanned document into blocks and using characteristics of the blocks, or a method of using edginess or the like.

For example, the method of using the changes in the brightness values of the pixels is to convert an RGB value of an image forming apparatus into a color space such as YCbCr or the like and make the pixels vivid through low-pass filtering. Next, based on first and second threshold values, the scanned document is segmented into a text T having the lowest brightness, an image I having brightness between the first and second threshold values, and a background B having brightness more than or equal to the second threshold value. Thereafter, the scanned document is segmented into an image area, a text area, and a background area with respect to all of the pixels of the scanned document.

As described above, a scanned document may be segmented into an image area, a text area, and a background area with respect to all pixels of the scanned document. However, the text and background areas may be treated as the equal area, and thus the scanned document may be segmented into a text and background area and an image area.

Figure 3:
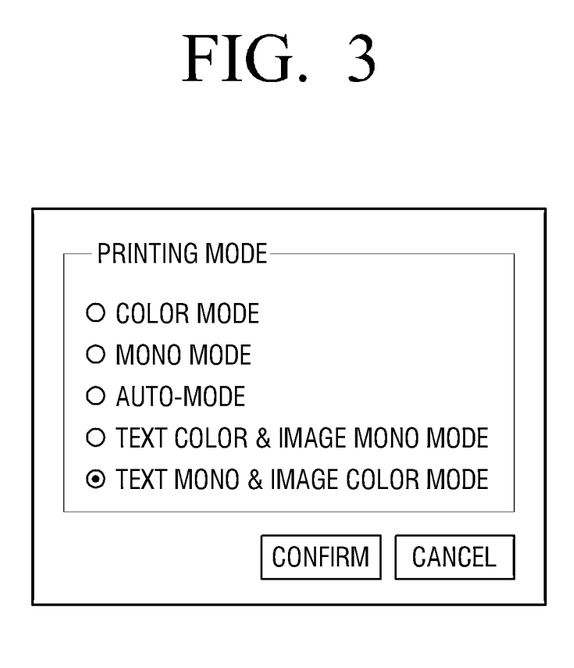
FIG. 3 is a view illustrating a user interface unit according to an exemplary embodiment of the present general inventive concept.

FIG. 3 is a view illustrating a display of the user interface unit 150 according to an exemplary embodiment.

Referring to FIG. 3, the user interface unit 150 displays a list of selection options including a color mode, a monochrome mode, an auto-mode, a text color and image monochrome mode, and a text monochrome and image color mode, from which to select a printing mode (i.e., an output mode).

However, alternatively from FIG. 3, the user interface unit 150 may display a list of selection options including a text color and image monochrome mode and a text monochrome and image color mode.

Operations of the user interface unit 150 and the conversion unit 130 will now be described in more detail with reference to FIG. 3.

If the color mode is selected in the user interface unit 150, the conversion unit 130 transmits color values (i.e., CbCr values) of all pixels of a document scanned by the scanner 110 to the output unit 140, which will be described later, regardless of a segmentation result of the detector 120.

If the monochrome mode is selected in the user interface unit 150, the conversion unit 130 sets the color values (i.e., CbCr values) of all pixels of the scanned document to "0" to convert the scanned document into a monochrome image regardless of the segmentation result of the detector 120.

If the text color and image monochrome mode is selected in the user interface unit 150, the conversion unit 130 transmits color values (i.e., CbCr values) of all pixels of a text area of the scanned document to the output unit 140 and sets color values (i.e., CbCr values) of all pixels of an image area of the scanned document to "0" to convert only the image area of the scanned document into a monochrome image.

If the text monochrome and image color mode is selected in the user interface unit 150, the conversion unit 140 transmits the color values (i.e., CbCr values) of all pixels of the image area of the scanned document to the output unit 140 and sets the color values (i.e., CbCr values) of all pixels of the text area of the scanned document to "0" to convert only the text area of the scanned document into a monochromechrome image.

According to the present general inventive concept, a text area and an image area of a scanned document may be converted into different colors and then output, and thus a color of an image which will be output may be precisely controlled. Accordingly, loss of information included in the text and image areas may be minimized, and a consumed amount of a color toner may be reduced.

Figure 4:
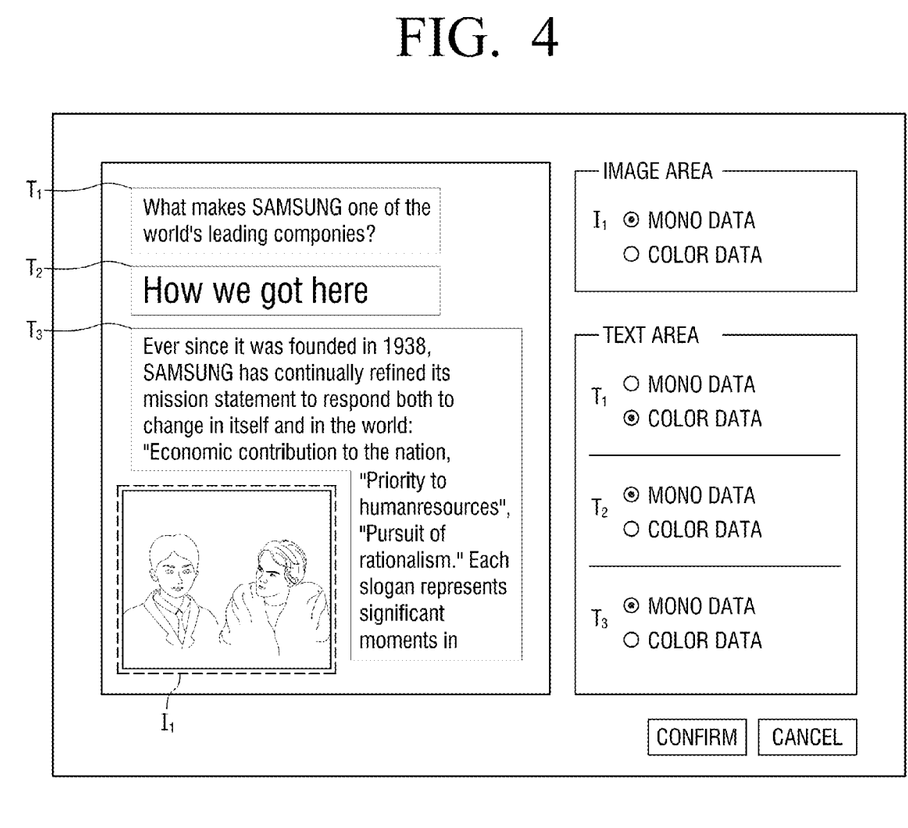
FIG. 4 is a view illustrating a user interface unit according to another exemplary embodiment of the present general inventive concept.

FIG. 4 is a view illustrating a display of the user interface unit 150 according to another exemplary embodiment.

Referring to FIG. 4, a scanned document is displayed in a left area of the user interface unit 150, and a selection area including at least one selection button is displayed in a right area of the user interface unit 150, wherein the selection area is to select whether to output text and image areas as color data or monochrome data.

The scanned document may be displayed as a thumbnail image in an area of the user interface unit 150.

The user interface unit 150 displays at least one text area and at least one image area included in the scanned document.

Also, the user interface unit 150 may separately display at least one text area and at least one image area included in the scanned document. For example, the user interface unit 150 may display at least one image area of the scanned document in green and at least one text area of the scanned document in black.

If a text area is displayed in the scanned document, the user interface unit 150 may provide a button for receiving a user command to select the displayed text area as one of monochrome data and color data.

For example, if three text areas $T_1$, $T_2$, and $T_3$ are displayed in the scanned document as shown in FIG. 4, the user interface unit 150 may provide buttons for receiving user commands to separately select each of the three areas $T_1$, $T_2$, and $T_3$ as one of monochrome data and color data.

FIGS. 5 through 8 are views illustrating an operation of the present general inventive concept in more detail.

Figure 5:
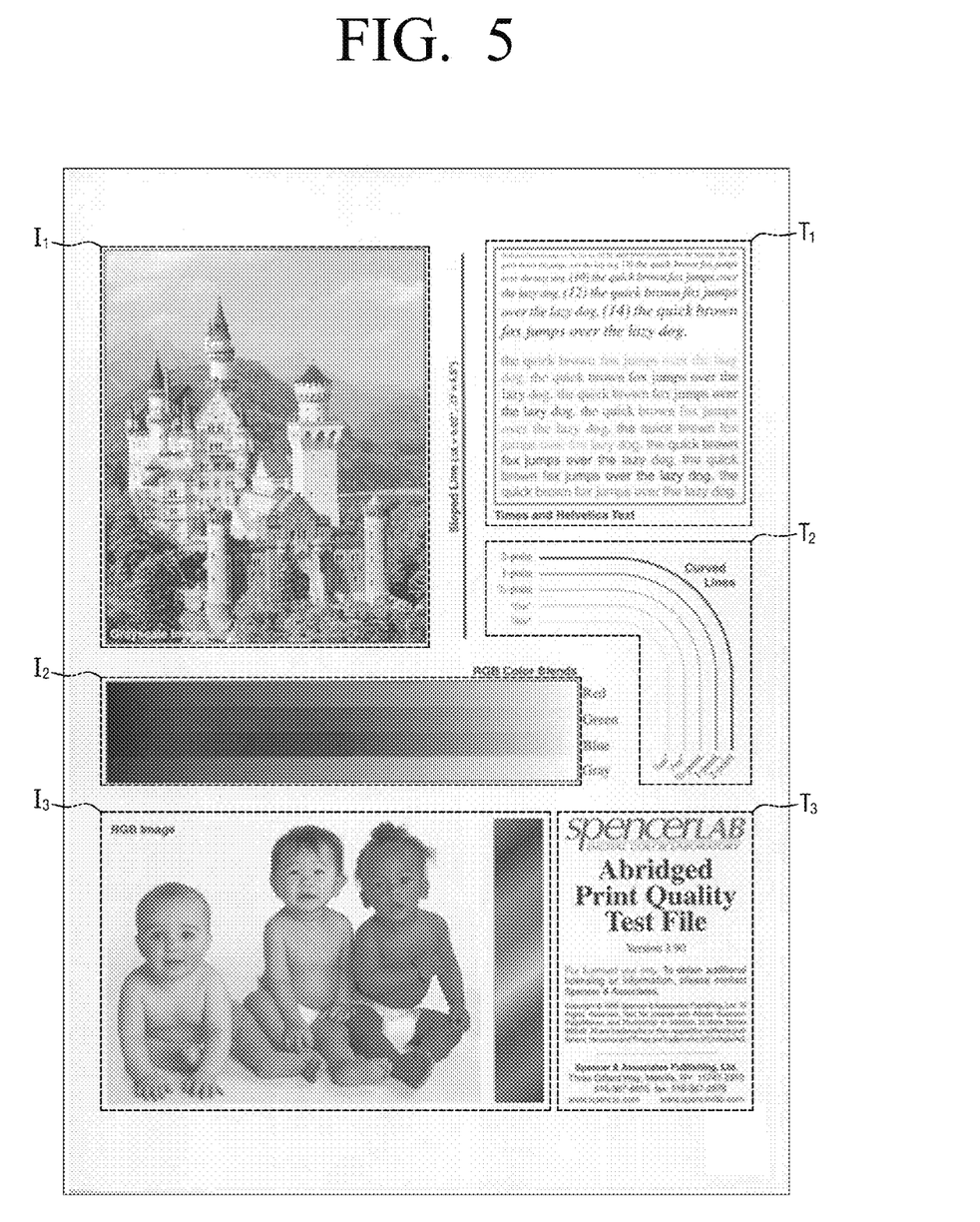
FIGS. 5 through 8 are views illustrating an operation of an image forming apparatus in detail according to exemplary embodiments of the present general inventive concept.

FIG. 5 is a view illustrating a scanned document according to an exemplary embodiment.

Referring to FIG. 5, the scanned document includes three image areas $I_1$, $I_2$, and $I_3$ and three text areas $T_1$, $T_2$, and $T_3$. While FIG. 5 illustrates three image areas $I_1$, $I_2$, and $I_3$ and three text areas $T_1$, $T_2$, and $T_3$, the present general inventive concept is not limited to operating on scanned documents including three image and three text areas, but rather may operate on documents including any number of image and text areas. Additionally, according to an exemplary embodiment a single area, for example text area $T_3$, may be subdivided into a plurality of areas.

Figure 6:
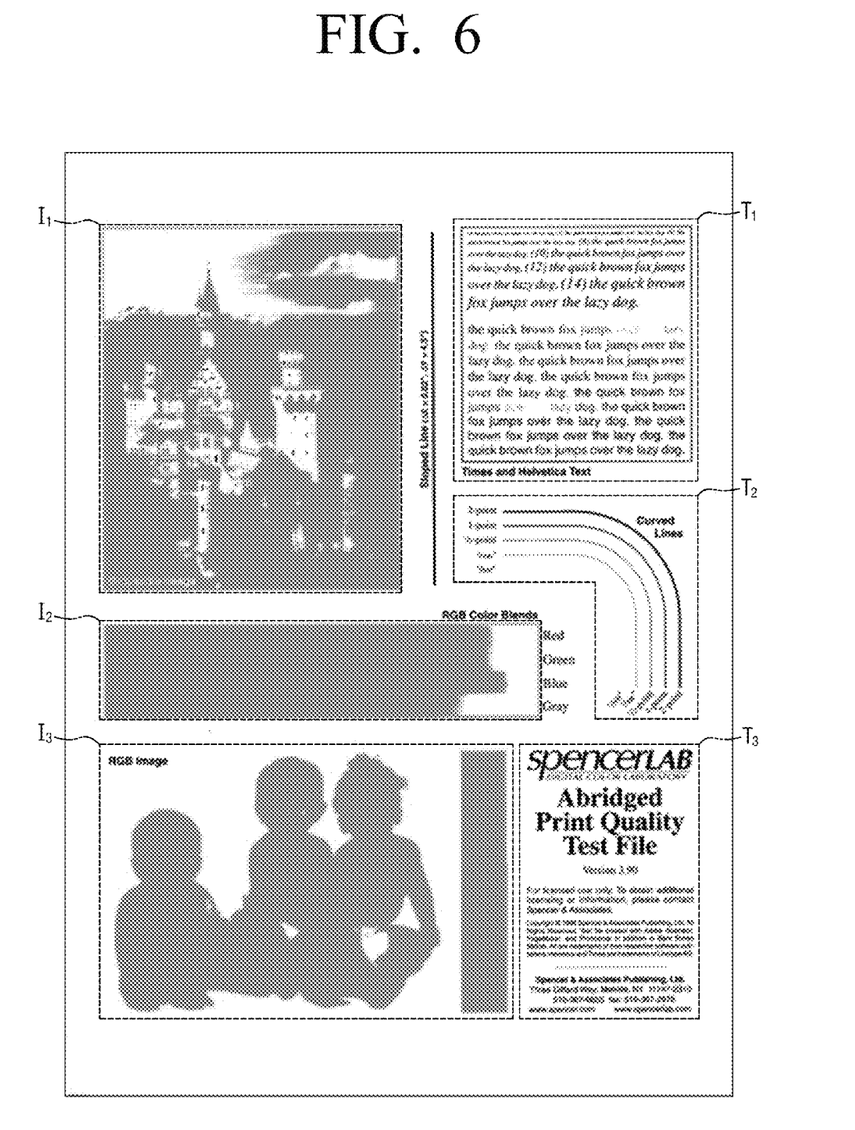

FIG. 6 is a view illustrating a document which is segmented into text areas and image areas, according to an exemplary embodiment.

Referring to FIG. 6, pixels of the scanned document are sorted out using brightness information, edginess, color information, and the like to segment the scanned document into the text and image areas. In this case, the text areas $T_1$, $T_2$, and $T_3$ are displayed in black, and the image areas $I_1$, $I_2$, and $I_3$ are displayed in green.

Figure 7:
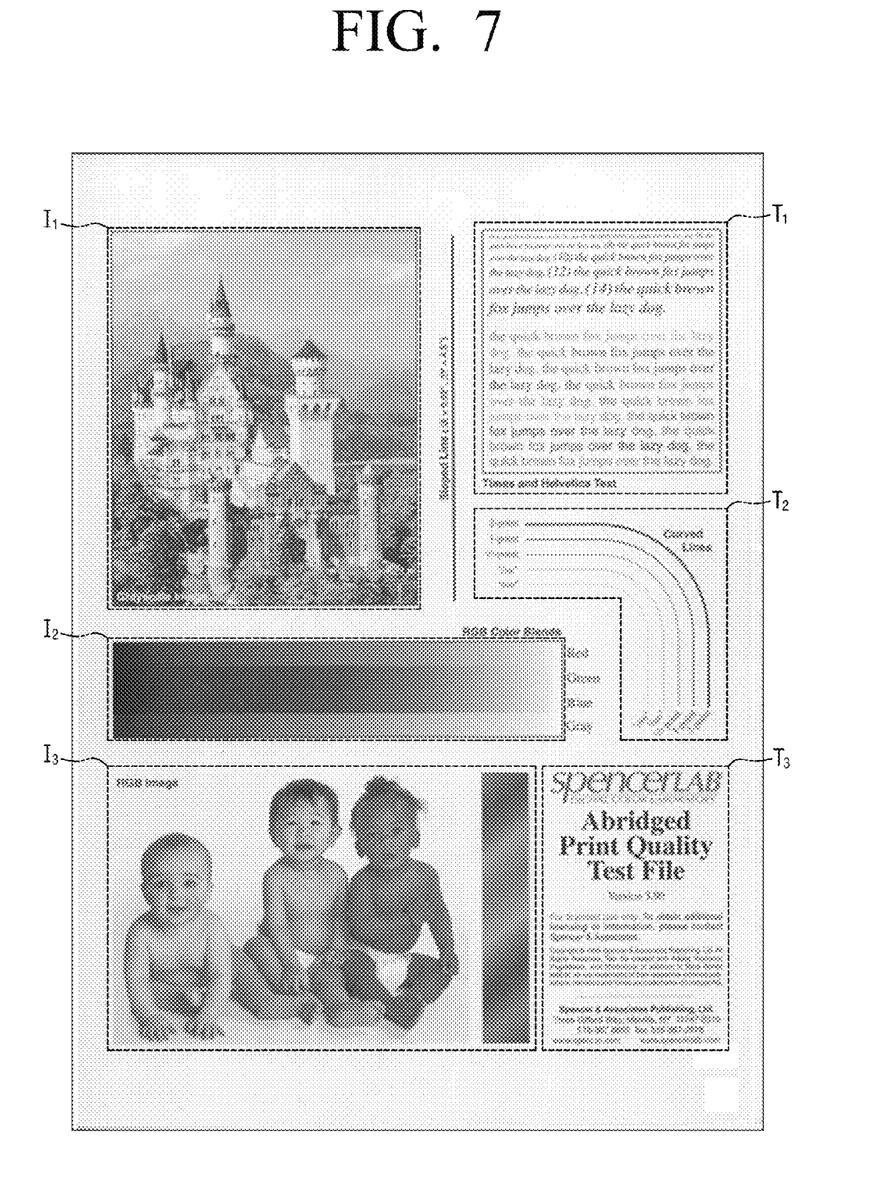

FIG. 7 is a view illustrating a document which will be output by applying a color mode to text areas $T_1$, $T_2$, and $T_3$ and a monochrome mode to image areas $I_1$, $I_2$, and $I_3$, according to an exemplary embodiment.

In an office environment in which a text includes more important information than an image in a document which will be output, the document may be output by applying a color mode to the text area and a monochrome mode to the image area.

Figure 8:
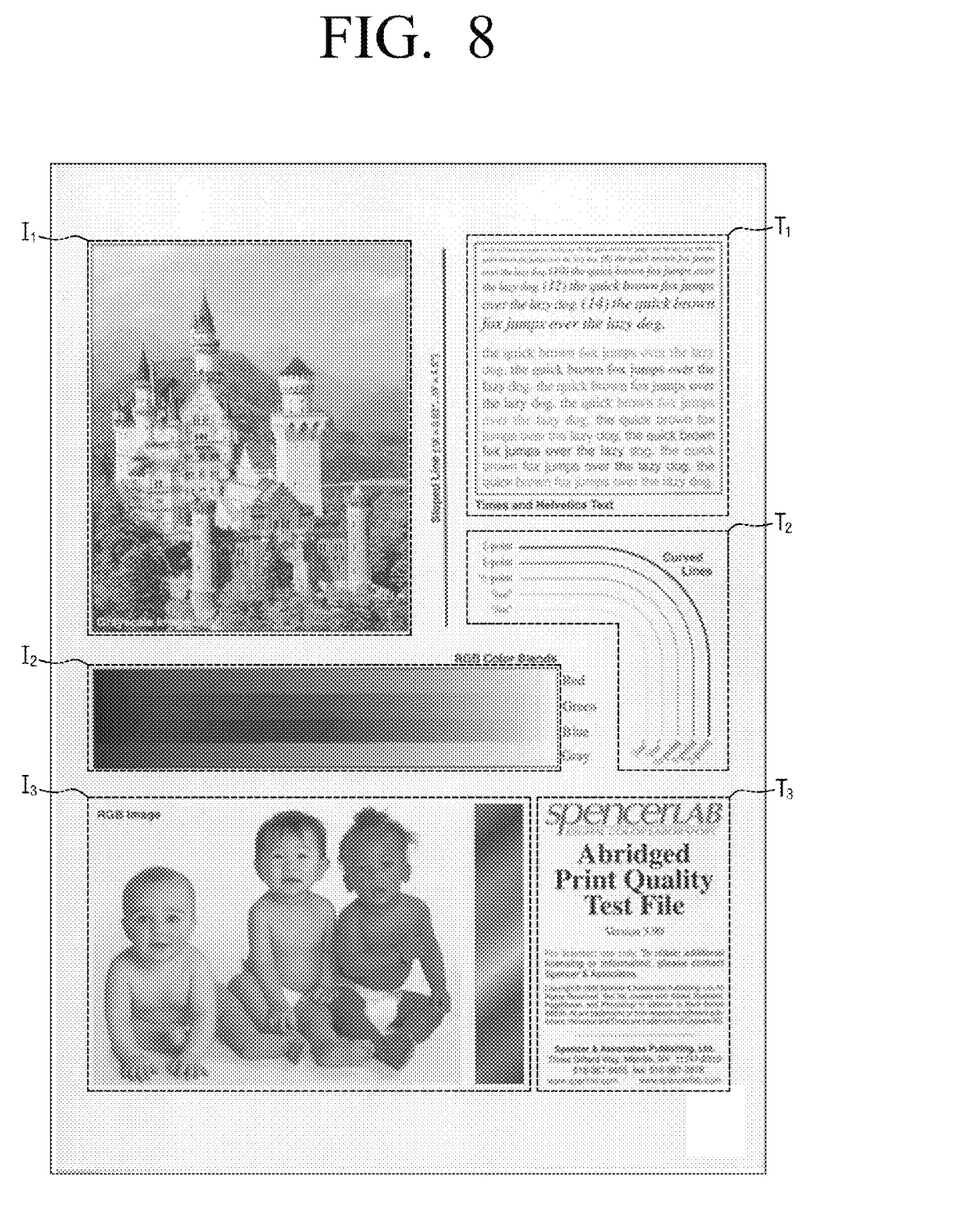

FIG. 8 is a view illustrating a document which will be output by applying a monochrome mode to text areas $T_1$, $T_2$, and $T_3$ and a color mode to image areas $I_1$, $I_2$, and $I_3$, according to an exemplary embodiment.

In an office environment in which an image includes more important information than a text area, the document may be output by applying a color mode to the image area and a monochrome mode the text area.

However, in the case that an image area or text area is monochrome data, even if a color mode is applied to the area including monochrome data, the area may be displayed as a monochrome image or monochrome text. For example, if an image area includes monochrome data, such as a grayscale image, as shown in image area $I_1$, of FIG. 5, even if a color mode is applied to image area $I_1$, the image area $I_1$, may be displayed as a monochrome image. In the case that an image or text area is color data, the image or text area may be displayed as a color image or color text. For example, if an image area includes color data, such as an RGB image, as shown in image areas $I_2$ and $I_3$ of FIG. 5, if a color mode is applied to image areas $I_2$ and $I_3$, the image areas $I_2$ and $I_3$ may be displayed as color images.

Accordingly, color information of an image may not be lost, and other texts may be output in a monochrome mode. Therefore, the texts may be more clearly displayed.

Figure 9:
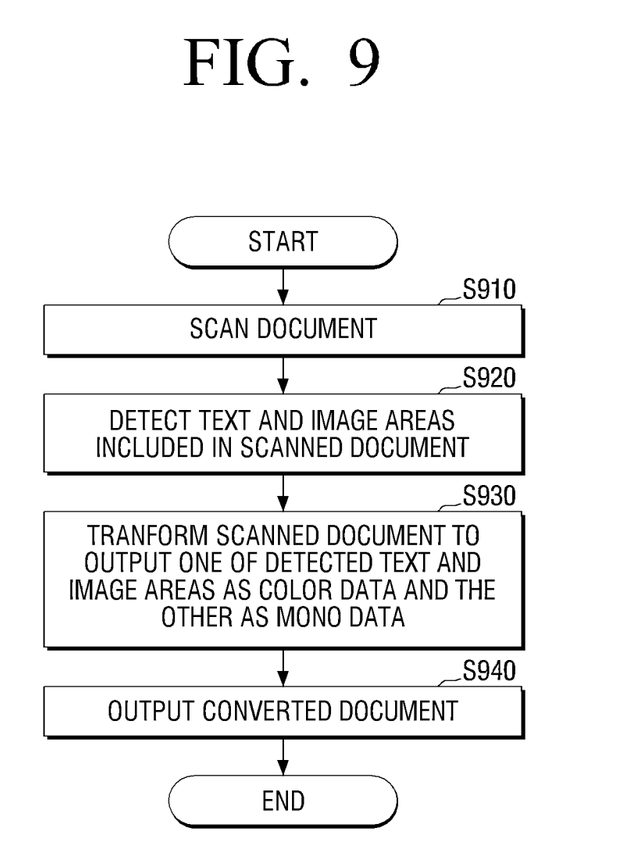
FIG. 9 is a flowchart illustrating a method of processing an image of an image forming apparatus according to an exemplary embodiment of the present general inventive concept.

FIG. 9 is a flowchart illustrating a method of processing an image of an image forming apparatus according to an exemplary embodiment.

Referring to FIG. 9, the scanner 110 scans a document (operation S910), and the detector 120 detects text and image areas included in the scanned document (operation S920).

The conversion unit 130 converts the scanned document to output one of the detected text and image areas as color data and the other as monochrome data (operation S930).

The output unit 140 outputs the converted document (operation S940).

In this case, the conversion unit 130 may convert the scanned document to set a color value of the detected text area to a preset color value so as to output the detected text area as monochrome data or set a color value of the detected image area to a preset color value so as to output the detected image area as monochrome data (operation S930).

According to the method of processing the image of the image forming apparatus 100, a whole or a part of a document which will be output may not be set to a monochrome mode or a dolor mode. However, the document may be segmented into text and image areas so as to output the text area as color data and the image area as monochrome data or output the text area as monochrome data and the image area as color.

The method may further include receiving a user command to select one of first and second modes, wherein the first mode is to output the text area as color data and the image area as monochrome data, and the second mode is to output the text area as monochrome and the image area as color data.

Hereinafter, repeated descriptions will be omitted.

Figure 10:
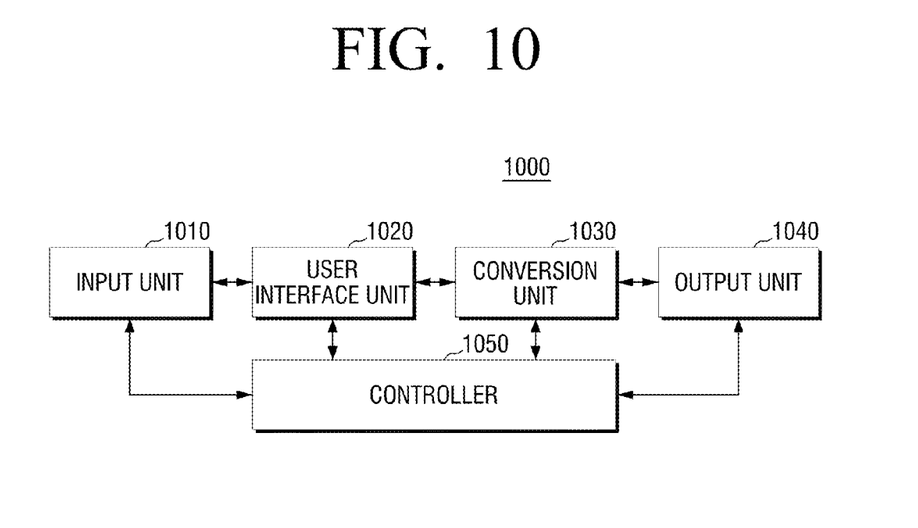
FIG. 10 is a block diagram illustrating an image forming apparatus according to another exemplary embodiment of the present general inventive concept.

FIG. 10 is a block diagram illustrating an image forming apparatus 1000 according to another exemplary embodiment.

Referring to FIG. 10, the image forming apparatus 1000 includes an input unit 1010, a user interface unit 1020, a conversion unit 1030, an output unit 1040, and a controller 1050.

The input unit 1010 receives an image. In more detail, the input unit 1010 may receive a scanned image or an image which is transmitted from an external host device (not shown). If the input unit 1010 receives the scanned image, the input unit 1010 may perform the same operation as the scanner 100 of FIG. 1.

The input unit 1010 may receive the image from the external host device. In more detail, the input unit 1010 may receive an image of which each object has been segmented from the external host device or may receive an image along with information about segmentation.

The user interface unit 1020 displays at least one of first through fifth modes as an output mode. The first mode is to output a text area as color data and an image area as monochrome data, the second mode is to output the text area as monochrome data and the image area as color data, and the third mode is to output a received image as monochrome data. The fourth mode is to output the received image as color data, and the fifth mode is to automatically output the received image as one of color data and monochrome data according to a color ratio of the received image. The user interface unit 1020 receives a user command to select one of the first through fifth modes as the output mode.

If one of the displayed output modes is selected, the conversion unit 1030 converts a color of the received image to output the received image according the selected output mode.

In more detail, if one of the first and second modes is selected, the conversion unit 1030 converts the color of the received image to output text and image areas of the received image in different colors.

If the user interface unit 1020 selects the third mode, the conversion unit 1030 converts the received image to output a color text of the text area of the received image with an underline or in bold.

If the received image is a color image, and the first mode is selected, the conversion unit 1030 converts the color of the received image so as to output the image area of the received image as monochrome data.

If the received image is the color image, and the second mode is selected, the conversion unit 1030 converts the color of the received image to output the text area of the received image as monochrome data.

The output unit 1040 outputs the image of which color has been converted.

According to another exemplary embodiment, the image forming apparatus 1000 may include the input unit 1010 which receives an image including text and image areas, the user interface unit 1020 which displays at least one of first through fifth modes as an output mode, wherein the first mode is to output the text area as color data and the image area as monochrome data, the second mode is to output the text area as monochrome data and the image data as color data, the third mode is to output the received image as monochrome data, the fourth mode is to output the received image as color data, and the fifth mode is to automatically output the received image as one of color data and monochrome data according to a color ratio of the received image, the conversion unit 1030 which converts a color of the received image according to the selected output mode if one of the displayed output modes is selected, and the output unit 1040 which outputs the image of which color has been converted.

According to a method of processing an image of the image forming apparatus 1000, if one of the first through fifth modes is selected as the output mode, the image of which color has been converted may be output according to the selected output mode.

Although various example embodiments of the present general inventive concept have been illustrated and described, it will be appreciated by those skilled in the art that changes may be made in these exemplary embodiments without departing from the principles, and spirit of the general inventive concept, the scope of which is defined in the appended claims and their equivalents.

What is claimed is:

1. A method of processing an image of an image forming apparatus, the method comprising:
   scanning a document;
   detecting a text area and an image area included in the scanned document;
   converting the scanned document to output one of the detected text and image areas as color data and the other of the detected text and image areas as monochrome data; and
   outputting the converted document,
   wherein the scanned document is converted to set a color value of the detected text area to a preset color value so as to output the detected text area as monochrome data or to set a color value of the detected image area to a preset color value so as to output the detected image area as monochrome data such that, if the scanned document is converted to output the detected text area as the monochrome data, and the detected text area comprises a color text and a monochrome text, the color text is converted to have a different display state from the monochrome text of the detected text area such that the color text is displayed in one of bold or underlined in the different display state while the monochrome text is not displayed in the one of the bold or the underlined.

2. The method as claimed in claim 1, further comprising receiving a user command to select one of first and second modes, wherein the first mode is to output the text area as color data and the image area as monochrome data, and the second mode is to output the text area as monochrome data and the image area as color data.

3. The method as claimed in claim 2, wherein when the user command to select one of the first and second modes is input, the scanned document is converted to output one of the detected text and image areas as color data and the other of the detected text and image areas as monochrome data based on the received user command.

4. An image forming apparatus comprising:
   a scanner to scan a document;
   a detector to detect text and image areas included in the scanned document;
   a conversion unit to convert the scanned document so as to output one of the detected text and image areas as color data and the other of the detected text and image areas as monochrome data; and
   an output unit to output the converted document,
   wherein the conversion unit converts the scanned document to set a color value of the detected text area to a preset color value so as to output the detected text area as monochrome data or to set a color value of the detected image area to a preset color value so as to output the detected image area as monochrome data, such that, if the scanned document is converted to output the detected text area as the monochrome data, and the detected text area comprises a color text and a monochrome text, the color text is converted to have a different display state from the monochrome text of the detected text area such that the color text is displayed in one of bold or underlined in the different display state while the monochrome text is not displayed in the one of the bold or the underlined.

5. The image forming apparatus as claimed in claim 4, further comprising a user interface unit to receive a user command to select one of first and second modes, wherein the first mode is to output the text area as color data and the image area as monochrome data, and the second mode is to output the text area as monochrome data and the image area as color data.

6. The image forming apparatus as claimed in claim 5, wherein when the user command to select one of the first and second modes is received, the conversion unit converts the scanned document to output one of the detected text and image areas as color data and the other of the detected text and image areas as monochrome data based on the received user command.

7. An image forming apparatus comprising:
an input unit to receive an image comprising text and image areas;
a user interface unit to display and to receive a user command to select at least one of first through fifth modes as an output mode, wherein the first mode is to output the text area as color data and the image area as monochrome data, the second mode is to output the text area as monochrome data and the image area as color data, the third mode is to output the received image as monochrome data, the fourth mode is to output the received image as color data, and the fifth mode is to automatically output the received image as one of color data and monochrome data according to a color ratio of the received image;
a conversion unit to convert a color of the received image according to the selected output mode such that, if the image is converted to output the text area as the monochrome data and the text area comprises a color text and a monochrome text, the color text is converted to have a different display state from the monochrome text of the text area such that the color text is displayed in one of bold or underlined in the different display state while the monochrome text is not displayed in the one of the bold or the underlined; and
an output unit to output the image of which color has been converted.

8. The image forming apparatus as claimed in claim 7, wherein if one of the first and second modes is selected, the conversion unit converts the color of the received image such that one of the text and image areas of the received image is color data and the other of the text and image areas is monochrome data.

9. The image forming apparatus as claimed in claim 7, wherein the input unit receives an image from an external host device.

10. The image forming apparatus as claimed in claim 7, wherein if the third mode is selected, the conversion unit converts a color text of the text area of the received image to have an underline or to be in bold.

11. The image forming apparatus as claimed in claim 7, wherein if the received image is a color image, and the first mode is selected, the conversion unit converts the image area of the received image into monochrome data.

12. The image forming apparatus as claimed in claim 7, wherein if the received image is a color image, and the second mode is selected, the conversion unit converts the text area of the received image into monochrome data.

13. An image forming apparatus comprising:
a scanner to scan a document;
a detector to detect at least one text area and at least one image area included in the scanned document;
a user interface unit to separately display the detected text and image areas and display a selection area to select each of the displayed text and image areas as one of color data and monochrome data;
a conversion unit to convert each of the text and image areas as one of color data and monochrome data according to the selection in the selection area such that, if the scanned document is converted to output the detected text area as the monochrome data, and the detected text area comprises a color text and a monochrome text, the color text is converted to have a different display state from the monochrome text of the detected text area such that the color text is displayed in one of bold or underlined in the different display state while the monochrome text is not displayed in the one of the bold or the underlined; and
an output unit to output the converted document.

14. An image forming apparatus comprising:
a scanner to scan a document;
a detector to detect text and image areas included in the scanned document;
a user interface unit to receive a user command to select an output mode of the scanned document;
a conversion unit to process at least one of the detected text and image areas based on the received user command such that, if the scanned document is processed to output the detected text area as monochrome data and the detected text area comprises a color text and a monochrome text, the color text is converted to have a different display state from the monochrome text of the detected text area such that the color text is displayed in one of bold or underlined in the different display state while the monochrome text is not displayed in the one of the bold or the underlined; and
an output unit to output the processed document,
wherein, if an output mode to output the text area as color data and the image area as monochrome data is selected, the conversion unit maintains a color value of the detected text area and converts a color value of the detected image area into a preset color value, and, if an output mode to output the text area as monochrome data and the image area as color data is selected, the conversion unit converts the color value of the detected text area into the preset color value and maintains the color value of the detected image area.

15. The image forming apparatus of claim 14, wherein if an output mode to output the scanned document as monochrome data is selected, the conversion unit converts a color value of the scanned document into a preset color value, and if an output mode to output the scanned document as color data is selected, the conversion unit maintains the color value of the scanned document and transmits the color value to the output unit.

16. An image forming apparatus comprising:
a detector to receive an electronic document and to detect at least one text area and at least one image area of the electronic document;
a conversion unit to convert the electronic document by converting at least one of the detected text or image areas from color data to monochrome data and maintaining another of the detected text or image areas as color data such that, if the electronic document is converted to output the detected text area as the monochrome data, and the detected text area comprises a color text and a monochrome text, the color text is converted to have a different display state from the monochrome text of the detected text area, such that when each respective detected text area is converted to monochrome data, the conversion unit changes a display state of any color text included in the respective detected text area to have an underline or be in bold; and an output unit to output the converted electronic document.

17. The image forming apparatus of claim 16, further comprising:

a user interface unit to receive a user command to select at least one output mode of the electronic document, wherein the conversion unit converts the electronic document according to the selected output mode.

18. The image forming apparatus of claim 17, wherein one output mode is selected and corresponds to the entire electronic document.

19. The image forming apparatus of claim 17, wherein a plurality of output modes are selected to correspond to each respective detected text area and each respective detected image area.

20. The image forming apparatus of claim 16, wherein the conversion unit converts the at least one detected text area or image area to monochrome data by setting a color value of the at least one detected text area or image area to a preset color value.

21. The image forming apparatus of claim 16, wherein the output unit outputs the converted electronic document by printing the converted electronic document on a paper medium or displaying the converted electronic document on a display screen.

* * * * *